(12) United States Patent
Anderson et al.

(10) Patent No.: US 9,330,370 B2
(45) Date of Patent: May 3, 2016

(54) UPDATING PROGRESSION OF PERFORMING COMPUTER SYSTEM MAINTENANCE

(71) Applicant: International Business Machines Corporation, Armonk, NY (US)

(72) Inventors: Eric M. Anderson, Friendswood, TX (US); Christopher J. Dawson, Arlington, VA (US); Leslie A. Nelson, Benson, NC (US); Brett W. Singletary, Clayton, NC (US)

(73) Assignee: International Business Machines Corporation, Armonk, NY (US)

( * ) Notice: Subject to any disclaimer, the term of this patent is extended or adjusted under 35 U.S.C. 154(b) by 345 days.

(21) Appl. No.: 13/847,517

(22) Filed: Mar. 20, 2013

(65) Prior Publication Data
US 2014/0289737 A1    Sep. 25, 2014

(51) Int. Cl.
*G06Q 10/06* (2012.01)
*G06F 9/48* (2006.01)

(52) U.S. Cl.
CPC .......... *G06Q 10/0633* (2013.01); *G06F 9/4843* (2013.01)

(58) Field of Classification Search
None
See application file for complete search history.

(56) References Cited

U.S. PATENT DOCUMENTS

| | | | |
|---|---|---|---|
| 6,157,953 A * | 12/2000 | Chang et al. | 709/225 |
| 8,185,550 B1 * | 5/2012 | Eichler | G06F 11/0709 707/783 |
| 2003/0033226 A1 * | 2/2003 | Anderson | 705/32 |
| 2008/0196107 A1 * | 8/2008 | Yip | H04L 41/0813 726/27 |
| 2008/0215713 A1 | 9/2008 | Cannon et al. | |
| 2009/0133026 A1 * | 5/2009 | Aggarwal et al. | 718/103 |
| 2009/0217371 A1 * | 8/2009 | Desai | G06F 9/468 726/17 |
| 2009/0249340 A1 * | 10/2009 | Akiyama et al. | 718/100 |
| 2010/0131916 A1 * | 5/2010 | Prigge | G06F 8/10 717/104 |
| 2011/0106738 A1 * | 5/2011 | Cheklin | 706/14 |
| 2011/0289547 A1 | 11/2011 | Aggarwal et al. | |
| 2012/0016713 A1 | 1/2012 | Wilcock et al. | |
| 2014/0089483 A1 * | 3/2014 | Anderson et al. | 709/223 |

OTHER PUBLICATIONS

Quest Software Inc., "Developer and Administrator Access to Production" [online]. Copyright 2011 Quest Software Inc., [retrieved on May 10, 2012]. Retrieved from the internet:<URL: http://www.webcitation.org/67U3FkE1z>.

* cited by examiner

*Primary Examiner* — Abdullah Al Kawsar
(74) *Attorney, Agent, or Firm* — Edward P. Li

(57) ABSTRACT

A computer-implemented method, computer program product, and computer system for updating progression of performing computer system management. A computer system receives a log-on of a change implementer onto a managed computer system and searches a change request on a managing computer system. In response to that the change request is found, the computer system receives from the change implementer a command with a current date and time and matches the command to one or more tasks within the change request. In response to determining that the command matches the one or more tasks, the computer system updates start dates and times of the one or more tasks. And, in response to that the one or more tasks are completed, the computer system updates stop dates and times of the one or more tasks.

18 Claims, 3 Drawing Sheets

UPDATING PROGRESSION OF PERFORMING COMPUTER SYSTEM MAINTENANCE

FIELD OF THE INVENTION

The present invention relates generally to computer service management technologies and tools, and more particularly to a system and method of updating progression of performing computer system management.

BACKGROUND

In computer service management, there is a demand for accurately managing and tracking changes that occur to computer systems. A great amount of system outages are due to changes in the computing environment, where the changes are not planned, authorized, or mistakenly implemented. Since the computer systems are largely managed by processes, there is always the possibility of human errors causing system outages.

All currently known solutions to the computer service management are related to processes and access restrictions. For example, if a process states that a change authorization or work record is required before system properties are adjusted, it is the administrator's responsibility to ensure the change authorization or work record exists. In another example, any user other than a super user has restricted access to a computer system; in this case, it is the super user's responsibility to ensure the process is fulfilled.

SUMMARY

Embodiments of the present invention provide a computer-implemented method, computer program product, and computer system for updating progression of performing computer system management. A computer system receives a log-on of a change implementer onto a managed computer system. The computer system searches a change request on a managing computer system. The computer system receives from the change implementer a command with a current date and time, in response to that the change request is found. The computer system matches the command to one or more tasks within the change request. The computer system updates start dates and times of the one or more tasks, in response to determining that the command matches the one or more tasks. And, the computer system updates stop dates and times of the one or more tasks, in response to that the one or more tasks are completed.

DETAILED DESCRIPTION

Figure 1:
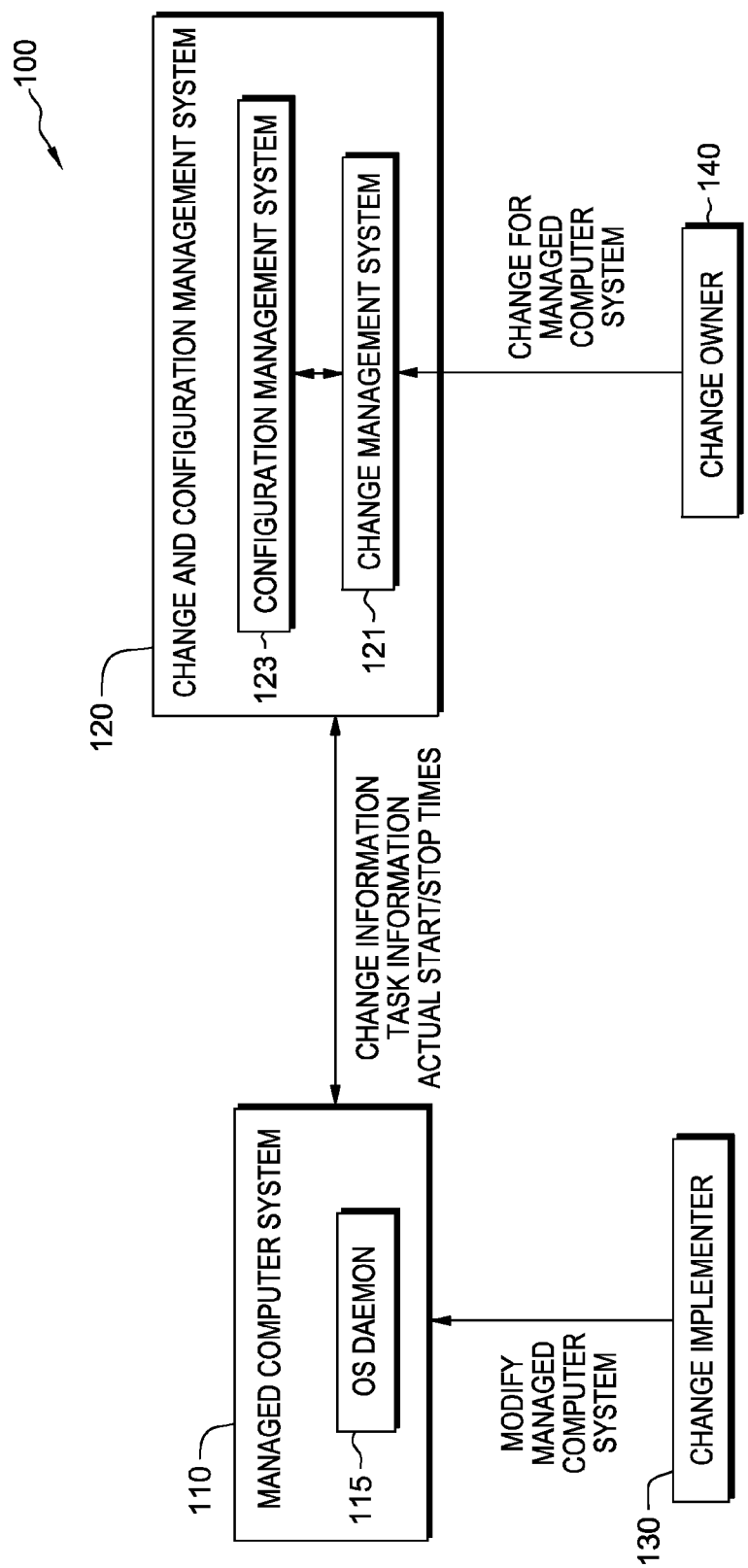
FIG. 1 is a diagram illustrating a service management system for updating progression of performing computer system management, in accordance with an exemplary embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, and micro-code) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. The term of "computer readable storage medium" or "one or more computer-readable tangible storage devices", as used in this document, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Program code embodied on a computer readable medium may be transmitted using any appropriate medium, including but not limited to wireless, wireline, optical fiber cable, RF (radio frequency), and any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/ or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a diagram illustrating service management system 100 for updating progression of performing computer system management, in accordance with an exemplary embodiment of the present invention. In this exemplary embodiment, service management system 100 comprises managed computer system 110 and change and configuration management system 120. Change and configuration management system 120 is on at least one managing computer system. In the exemplary embodiment shown in FIG. 1, change management system 121 and configuration management system 123 are two primary components of change and configuration management system 120. Change requests on managed computer system 110 are managed by change owner 140 through change and configuration management system 120. On change management system 121, change owner 140 creates, approves, and authorizes the changes for managed computer system 110. Change owner 140 manages records of the change requests on change management system 121. The records of change requests include information about which configuration items (CIs) on managed computer system 110 are to be changed. Within each of the change requests, there are one or more tasks. Configuration management system 123 is a database that stores information of configuration items (CIs) of managed computer system 110.

Change implementer 130 modifies managed computer system 110. Managed computer system 110 comprises OS daemon 115. OS daemon 115 monitors commands entered by change implementer 130. Monitoring commands uses known art, for example the audit subsystem for IBM AIX®, the event registry in Microsoft Windows®, or other similar systems for other platforms. OS daemon 115 sends commands and data to change and configuration management system 120, and receives information from change and configuration management system 120. Managed computer system 110 and change and configuration management system 120 communicate information of the change requests, information of tasks within each of the change requests, and actual start and stop times of the tasks and/or change requests being implemented by change implementer 130.

In the exemplary embodiment, OS daemon 115 and change and configuration management system 120 interpret commands entered by change implementer 130 of managed computer system 110, and use information of the commands and information of managed computer system 110 (for example, including the userid of the person who logs onto managed computer system 110, the hostname or IP address of managed computer system 110) in combination with the current date and time to automatically populate actual start and stop times for a change implemented by change implementer 130 of managed computer system 110.

In service management system 100, the planned changes or change requests on managed computer system 110 are created, approved, and authorized on change and configuration management system 120 by the change owner 140. Thus, service management system 100 ensures no damaging or disruptive commands can be issued against managed computer systems 110 unless work requests for the changes have been generated, approved, and authorized.

In FIG. 1, for the purpose of demonstration, only one managed computer system (managed computer system 110) is shown in the exemplary embodiment of service management system 100. It is apparent that service management system 100 may comprise multiple managed computer systems. It is also apparent that service management system 100 may comprise one or more change and configuration management systems.

Figure 2:
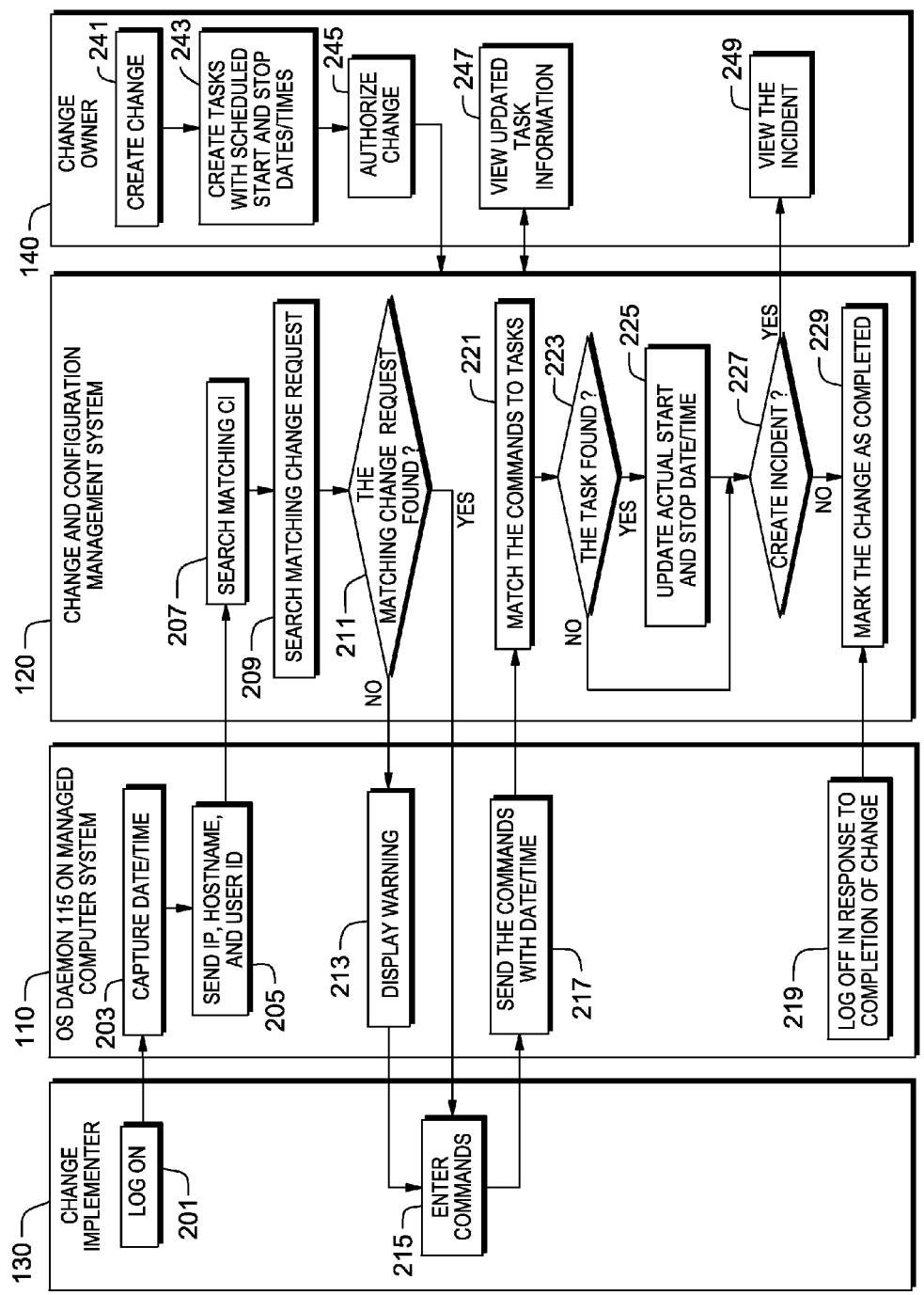
FIG. 2 is a flowchart of the service management system shown in FIG. 1 for updating progression of performing computer system management, in accordance with an exemplary embodiment of the present invention.

FIG. 2 is a flowchart of service management system 100 shown in FIG. 1 for updating progression of performing computer system management, in accordance with an exemplary embodiment of the present invention. At step 201, change implementer 130 logs onto managed computer system 110 to perform a change. At step 203, OS daemon 115 on managed computer system 110 captures current date and time. The current date and time are based on the internal clock of managed computer system 110 or a call to a global clock system such as NTP (Network Time Protocol).

At step 205, OS daemon 115 on managed computer system 110 sends information about change implementer 130 and managed computer system 110 to change and configuration management system 120. In the exemplary embodiment, the information about change implementer 130 and managed computer system 110 includes the userid of change implementer 130 who logs onto managed computer system 110 and the hostname or IP address of managed computer system 110. For example, to send the information, OS daemon 115 uses commands "send userid <userid>", "send hostname <hostname>", and "send ip address <ip>".

At step 207, change and configuration management system 120 searches matching CIs (configuration items) of managed computer system 110. The CIs (configuration items) of managed computer system 110 are stored on configuration management system 123 on change and configuration management system 120. Change and configuration management system 120 searches CIs (configuration items) of managed computer system 110 based on the hostname or IP address of managed computer system 110.

At step 209, change and configuration management system 120 searches a change request that is associated with the CIs of managed computer system 110 and has valid status, for example status of "in progress" or "scheduled". The change request may also be searched by using instructions, summary, or details associated with managed computer system 110.

At decision block 211, change and configuration management system 120 determines whether the change request is found. In response to not finding the change request (No branch of decision block 211), at step 213, OS daemon 115 on managed computer system 110 displays a waning. For example, the warning notifies change implementer 130 that no change request is found. In other embodiments, OS daemon 115 may redirect change implementer 130 onto change and configuration management system 120 to check status of the change request that change implementer 130 is expecting to work on.

In response to that the change request is found (YES branch of decision block 211), or in response to that OS daemon 115 displays a warning at step 213, change implementer 130 enters commands at step 215. The commands are either implementation commands such as "installp websphere" or interaction commands such as "start task n".

In response to receiving the commands from change implementer 130, OS daemon 115 on managed computer system 110, at step 217, sends the commands with the current date and time to change and configuration management system 120. For example, to send the commands entered by change implementer 130 with the current date and time, OS daemon 115 uses the commands "send command entered", "send date <current date>", and "send time <current time>".

In response to receiving the commands sent by OS daemon 115 at step 217, change and configuration management system 120, at step 221, matches the commands to one or more tasks. The one or more tasks (for example, installing Websphere®, DB2®, and then some application logic) are within the change request. The one or more tasks are implementation tasks that require commands to be run on managed computer system 110. Within one of the one or more tasks there are a series of commands (for example "installp websphere") or key words associated with the one of the one or more tasks; entering commands or keywords by change implementer 130 signals that the one of the one or more tasks has started or is completed. At this step, change and configuration management system 120 searches implementation tasks to find one or more tasks that are either owned directly by change implementer 130 or the group to which change implementer 130 belongs. Change and configuration management system 120 uses these commands to determine which task or tasks are currently being worked on. One or more tasks may be found in the change request. At this step, change and configuration management system 120 checks whether the commands match the one or more tasks. If the commands do not match the one or more tasks, change and configuration management system 120 determines that the commands are destructive or incorrect commands are run. In other embodiments, in response to determining that the commands do not match the one or more tasks change and configuration management system 120 automatically generates an incident ticket for further follow up.

At decision block 223, change and configuration management system 120 determines whether the one or more tasks are found. In response to determining that the one or more tasks are found (YES branch of decision block 223), change and configuration management system 120, at step 225, updates the actual start and stop times of the one or more tasks. At this step, change and configuration management system 120 determines scheduled start and stop times at which the tasks are expected to be executed. If a command matches one of the one or more tasks and furthermore matches a command starting the one of the one or more tasks, the current start date and time are automatically populated into actual start date and time of the command. A similar method is used for populating the actual stop time at the end of the one of the one or more tasks.

In response to determining that the tasks are not found (No branch of decision block 223), change and configuration management system 120, at decision block 227, determines whether an incident ticket is requested by change implementer 130. In response to determining that the incident ticket is requested by change implementer 130 (YES branch of decision block 227), change and configuration management system 120 sends the request for the incident ticket to change owner 140 for change owner's review at step 249.

In other embodiments, in response to determining that the tasks are not found (No branch of decision block 223), change and configuration management system 120 may send a warning to change implementer 130. If no task is found, change and configuration management system 120 determines that the command has no bearing on the change request. In either case, the command is copied to a log entry of the change request.

In response to completion of the change implemented by change implementer 130, at step 219, OS daemon 115 logs off change implementer 130 from performing computer system management on managed computer system 110. In response to that OS daemon 115 logs off change implementer 130 from performing computer system management, or in response to determining that the incident ticket is not requested by change implementer 130 (NO branch of decision block 227), at step 229, change and configuration management system 120 marks the change request as completed.

In other embodiments, change and configuration management system 120 determines whether a scheduled stop time of a task is reached. In response to determining that the scheduled stop time of the task is reached, change and configuration management system 120 may send change implementer 130 a warning (for example, "back out the change now" or "running out of time"), automatically log out change implementer 130, cancel the change request, or mark the change request as "failed".

In other embodiments, OS daemon 115 or change and configuration management system 120 allows change implementer 130 to override the automatic detection of an implementation task by using a set of key words. For example, the keywords includes "start task n" (which signals that the change implementer 130 starts task n), "end task n" (which signals that the change implementer 130 stops task n), "done" (which signals that a current task is complete), and "fail change" (which marks the change request as failed). OS daemon 115 sends to change and configuration management system 120 the keywords entered by change implementer 130 using commands, for example, "send start task n" and "send end task n".

In other embodiments, in response to that a task is started, change and configuration management system 120 detects status of the task in the change request, and changes the status of the task during the progress of implementing the task. For example, change and configuration management system 120 marks the status of the task from "waiting to start" to "started" and from "started" to "completed".

In other embodiments, OS daemon 115 on managed computer system 110 receives information from change and configuration management system 120. For example, OS daemon 115 receives information by using commands: "receive change ID" and "receive task list".

Referring to FIG. 2, change owner 140 creates a change request at step 241. Change owner 140 creates the tasks within the change request at step 243; each of the tasks has scheduled start and stop dates/times. At step 245, change owner 140 authorizes the change request and saves the change request on change management system 121 which is one of primary components of change and configuration management system 120. Further referring to FIG. 2, change owner 140 views updated task information on change management system 121 at step 247.

Figure 3:
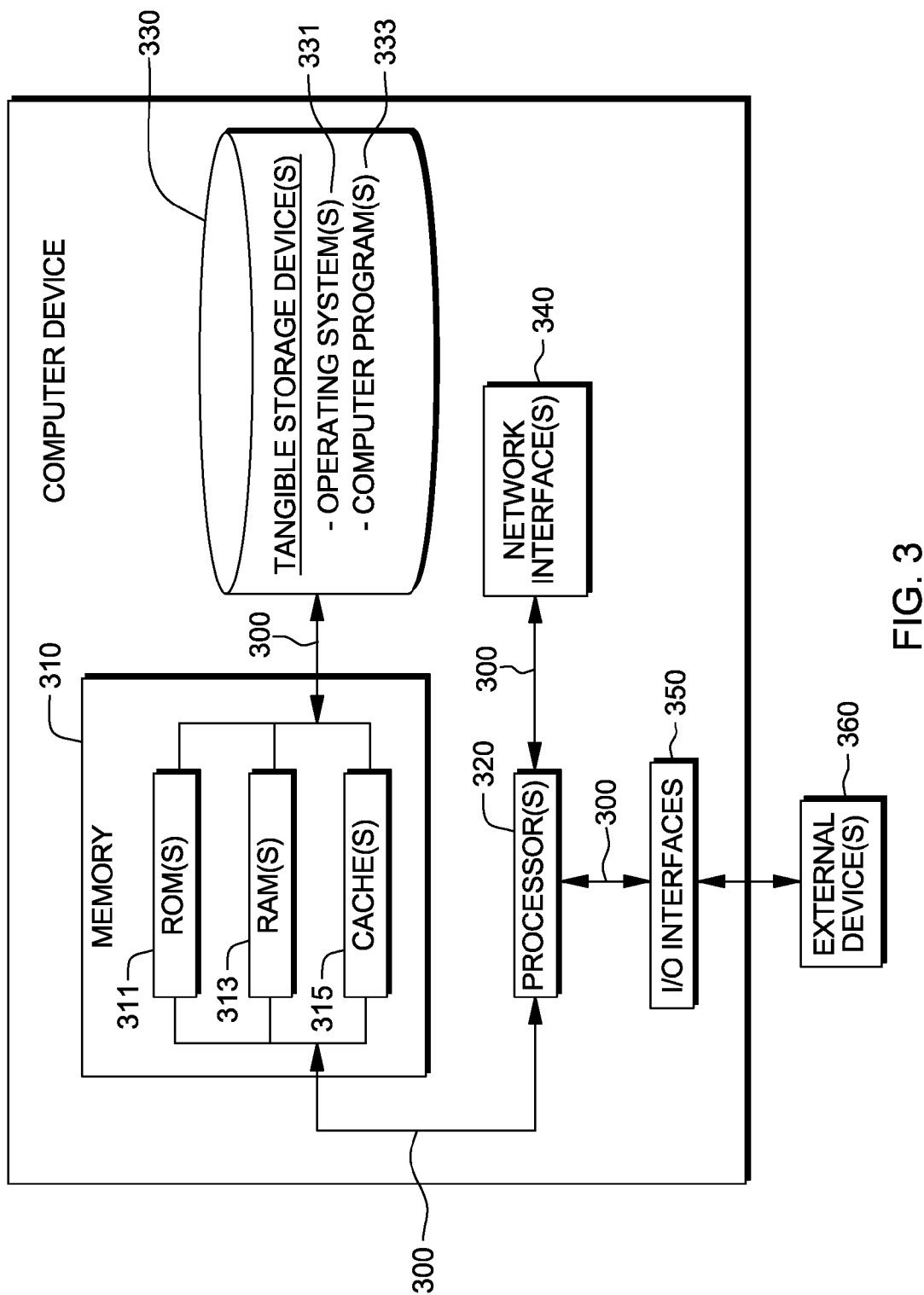
FIG. 3 is a diagram of a computer device hosting a managed computer system or a change and configuration management system on a managing computer system, in accordance with an exemplary embodiment of the present invention.

FIG. 3 is a diagram of a computer device hosting managed computer system 110 or change and configuration management system 120 on a managing computer system, in accordance with an exemplary embodiment of the present invention. It should be appreciated that FIG. 3 provides only an illustration of one implementation and does not imply any limitations with regard to the environment in which different embodiments may be implemented.

Referring to FIG. 3, the computer device includes processor(s) 320, memory 310, tangible storage device(s) 330, network interface(s) 340, and I/O (input/output) interface(s) 350. In FIG. 3, communications among the above-mentioned components of the computer device are denoted by numeral 300. Memory 310 includes ROM(s) (Read Only Memory) 311, RAM(s) (Random Access Memory) 313, and cache(s) 315.

One or more operating system(s) 331 and one or more computer program(s) 333 reside on one or more computer-readable tangible storage device(s) 330. For example, on a computer device hosting managed computer system 110, one or more computer program(s) 333 include OS daemon 115 (shown in FIG. 1). In the exemplary embodiment, on a computer device hosting the managing computer system, change and configuration management system 120 (including change management system 121 and configuration management system 123, both shown in FIG. 1) resides on one or more computer-readable tangible storage device(s) 330. In other embodiments, change management system 121 and configuration management system 123 may reside on two separate computer devices, respectively.

The computer device further includes I/O interface(s) 350. I/O interface(s) 350 allow for input and output of data with external device(s) 360 that may be connected to the computer device. The computer device further includes network interface(s) 340 for communications between the computer device and a computer network.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for updating progression of performing computer system management on a managed computer system, the method comprising:

receiving, by a managing computer system, from the managed computer system, information of a change implementer and the managed computer system;

searching, by the managing computer system, on a change and configuration system on the managing computer system, configuration items of the managed computer, based on the information received;

searching, by the managing computer system, on the change and configuration system a change request associated with the configuration items and authorized by a change owner;

determining, by the managing computer system, whether the change is found on the change and configuration system in the change requests authorized by the change owner;

receiving, by the managing computer system, from the managed computer system change implementer, a command with a current date and time, the command entered by the change implementer, in response to determining that the change request is found on the change and configuration system;

searching and matching, by the managing computer system, on the change and configuration system, one or more tasks in the change request, the one or more tasks started by the command and owned by the change implementer;

updating, by the managing computer system, on the change and configuration system, status of the one or more tasks with start dates and times of the one or more tasks, in response to determining that the command matches the one or more tasks found in the change request on the change and configuration system and owned by the change implementer;

sending, by the change and configuration system, to the change implementer on the managed computer system a warning in response to determining that a scheduled stop time for the one or more tasks has reached before completion of the one or more tasks and updating by the managing computer system on the change and configuration system the status of the one or more tasks as failed; and updating, by the managing computer system, on the change and configuration system, the status of the one or more tasks with stop dates and times of the one or more tasks, in response determining that the one or more tasks are completed within the scheduled stop time.

2. The method of claim 1, further comprising: sending, by the managing computer system, to the change implementer a warning, in response to determining that the change request is not found or in response to determining that the one or more tasks are not found on the change and configuration system.

3. The method of claim 1, further comprising: redirecting, by the managing computer system, the change implementer onto the managing computer system to check status of the change request, in response to determining that the change request is not found on the change and configuration system.

4. The method of claim 1, further comprising: generating, by the managing computer system, an incident ticket, in response to determining that the one or more tasks are not found on the change and configuration system.

5. The method of claim 1, further comprising:
detecting, by the managing computer system, the status of the one or more tasks; and
updating, by the managing computer system, the status of the one or more tasks.

6. The method of claim 1, further comprising: logging off, by the managing computer system, the change implementer from performing management on the managed computer system, in response to determining that the one or more tasks are not found on the change and configuration system.

7. A computer program product for managing and tracking computer commands associated with a change on a managed computer system, the computer program product comprising:
one or more computer-readable tangible storage devices and program instructions stored on at least one of the one or more computer-readable tangible storage devices, the program instructions comprising:
program instructions to receive, by a managing computer system, from the managed computer system, information of a change implementer and the managed computer system;
program instructions to search, by the managing computer system, on a change and configuration system on the managing computer system, configuration items of the managed computer, based on the information received;
program instructions to search, by the managing computer system, on the change and configuration system, a change request associated with the configuration items and authorized by a change owner;
program instructions to determine, by the managing computer system, whether the change request is found on the change and configuration system;
program instructions to receive, by the managing computer system, from the managed computer system, a command with a current date and time, the command entered by the change implementer, in response to determining that the change request is found on the change and configuration system;
program instructions to search and match, by the managing computer system, on the change and configuration system, one or more tasks in the change request, the one or more tasks started by the command and owned by the change implementer;
program instructions to update, by the managing computer system, on the change and configuration system, status of the one or more tasks with start dates and times of the one or more tasks, in response to determining that the command matches the one or more tasks found on the change and configuration system and owned by the change implementer;
program instructions to send, by the change and configuration system, to the change implementer on the managed computer system a warning in response to determining that a scheduled stop time for the one or more tasks has reached before completion of the one or more tasks and update by the managing computer system on the change and configuration system the status of the one or more tasks as failed; and
program instructions to update, by the managing computer system, on the change and configuration system, the status of the one or more tasks with stop dates and times of the one or more tasks, in response to determining that the one or more tasks are completed within the scheduled stop time.

8. The computer program product of claim 7, further comprising: program instructions to send, by the managing computer system, to the change implementer a warning, in response to determining that the change request is not found or in response to determining that the one or more tasks are not found on the change and configuration system.

9. The computer program product of claim 7, further comprising: program instructions to redirect, by the managing computer system, the change implementer onto the managing computer system to check status of the change request, in response to determining that the change request is not found on the change and configuration system.

10. The computer program product of claim 7, further comprising: program instructions to generate, by the managing computer system, an incident ticket, in response to determining that the one or more tasks are not found on the change and configuration system.

11. The computer program product of claim 7, further comprising:
program instructions to detect, by the managing computer system, the status of the one or more tasks; and
program instructions to update, by the managing computer system, the status of the one or more tasks.

12. The computer program product of claim 7, further comprising: program instructions to log off, by the managing computer system, the change implementer from performing management on the managed computer system, in response to determining that the one or more tasks are not found on the change and configuration system.

13. A computer system for managing and tracking computer commands associated with a change on a managed computer system, the computer system comprising:
one or more processors, one or more computer-readable tangible storage devices, and program instructions stored on at least one of the one or more computer-readable tangible storage devices for execution by at least one of the one or more processors, the program instructions comprising:
program instructions to receive, by a managing computer system, from the managed computer system, information of a change implementer and the managed computer system;
program instructions to search, by the managing computer system, on a change and configuration system on the managing computer system, configuration items of the managed computer, based on the information received;
program instructions to search, by the managing computer system, on the change and configuration system, a change request associated with the configuration items and authorized by a change owner;
program instructions to determine, by the managing computer system, whether the change request is found on the change and configuration system;
program instructions to receive, by the managing computer system, from the managed computer system, a command with a current date and time, the command entered by the change implementer, in response to determining that the change request is found on the change and configuration system;
program instructions to search and match, by the managing computer system, on the change and configuration system, one or more tasks in the change request, the one or more tasks started by the command and owned by the change implementer;
program instructions to update, by the managing computer system, on the change and configuration system, status of the one or more tasks with start dates and times of the one or more tasks, in response to determining that the command matches the one or more tasks found on the change and configuration system and owned by the change implementer;
program instructions to send, by the change and configuration system, to the change implementer on the managed computer system a warning in response to determining that a scheduled stop time for the one or more tasks has reached before completion of the one or more tasks and update by the managing computer system on the change and configuration system the status of the one or more tasks as failed; and program instructions to update, by the managing computer system, on the change and configuration system, the status of the one or more tasks with stop dates and times of the one or more tasks, in response to determining that the one or more tasks are completed within the scheduled stop time.

14. The computer system of claim 13, further comprising: program instructions to send, by the managing computer system, to the change implementer a warning, in response to determining that the change request is not found or in response to determining that the one or more tasks are not found on the change and configuration system.

15. The computer system of claim 13, further comprising: program instructions to redirect, by the managing computer system, the change implementer onto the managing computer system to check status of the change request, in response to determining that the change request is not found on the change and configuration system.

16. The computer system of claim 13, further comprising: program instructions to generate, by the managing computer system, an incident ticket, in response to determining that the one or more tasks are not found on the change and configuration system.

17. The computer system of claim 13, further comprising:
program instructions to detect, by the managing computer system, the status of the one or more tasks; and
program instructions to update, by the managing computer system, the status of the one or more tasks.

18. The computer system of claim 13, further comprising: program instructions to log off, by the managing computer system, the change implementer from performing management on the managed computer system, in response to determining that the one or more tasks are not found on the change and configuration system.

* * * * *